United States Patent [19]

Allport

[11] Patent Number: 4,984,739
[45] Date of Patent: Jan. 15, 1991

[54] DRIP IRRIGATION HOSE

[76] Inventor: Davies Allport, 9650 Camino Ruiz, San Diego, Calif. 92126

[21] Appl. No.: 147,814

[22] Filed: Jan. 22, 1988

Related U.S. Application Data

[63] Continuation-in-part of Ser. No. 892,420, Aug. 4, 1986.

[51] Int. Cl.$^5$ .......................... B05B 1/36; B05B 15/00
[52] U.S. Cl. ...................................... 239/193; 239/542
[58] Field of Search ............... 239/193, 542, 553, 562, 239/566, 567

[56] References Cited

U.S. PATENT DOCUMENTS

| | | | |
|---|---|---|---|
| 2,683,061 | 7/1954 | Tuttle | 239/193 |
| 3,896,999 | 7/1975 | Barragán | 239/542 |
| 4,247,051 | 1/1981 | Allport | 239/542 |
| 4,430,020 | 2/1984 | Robbins | 239/542 X |
| 4,473,191 | 9/1984 | Chapin | 239/542 |
| 4,726,520 | 2/1988 | Brown | 239/542 |

FOREIGN PATENT DOCUMENTS 13925  4/1960  Israel ................................. 239/542

Primary Examiner—Andres Kashnikow
Assistant Examiner—William Grant
Attorney, Agent, or Firm—Christie, Parker & Hale

[57] ABSTRACT

A drip irrigation hose formed of an elongated flat sheet of flexible water impervious material having two longitudinally extending ribs attached to a surface of the material and positioned adjacent to one edge thereof, the ribs being die-formed to be precisely dimensioned and precisely spaced from one another and to be serrated on the inner sides thereof. The sheet is turned over on itself to form a lapped longitudinal seam between opposing longitudinal margins of the sheet, and the ribs are heat sealed, or otherwise attached to the other surface of the sheet and extend between the opposing margins to form a flow regulating tube, with the serrated sides of the ribs creating turbulence in the water flowing in the flow regulating tube. The hose has filter-type inlets longitudinally spaced along the flow regulating tube and outlets from the flow regulating tube longitudinally displaced from the respective inlets.

2 Claims, 1 Drawing Sheet

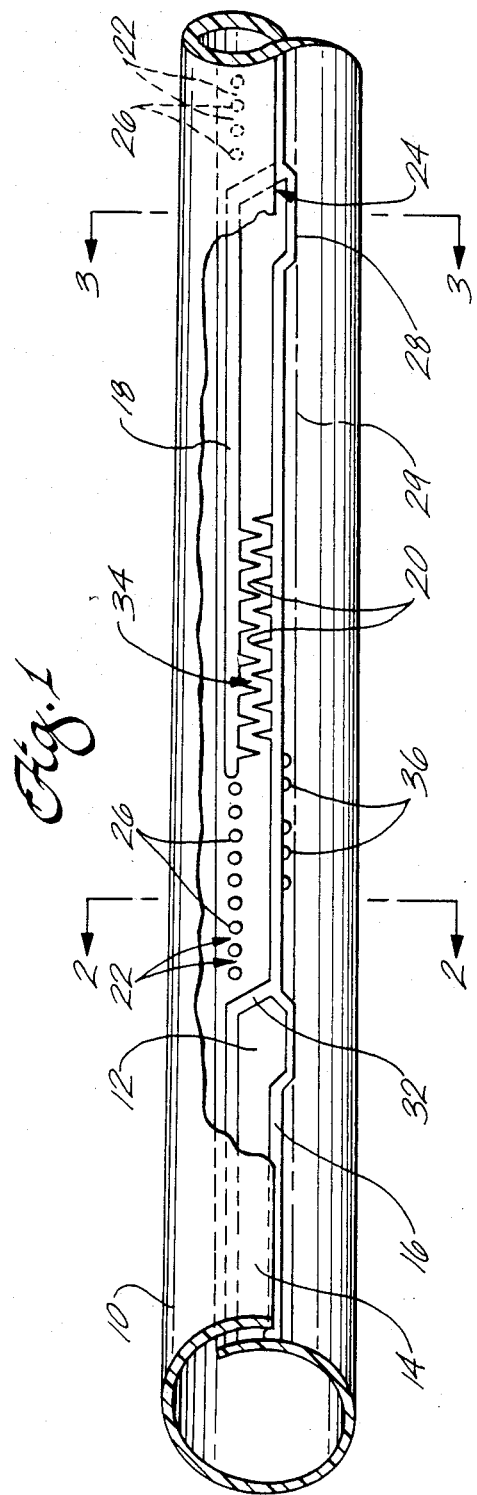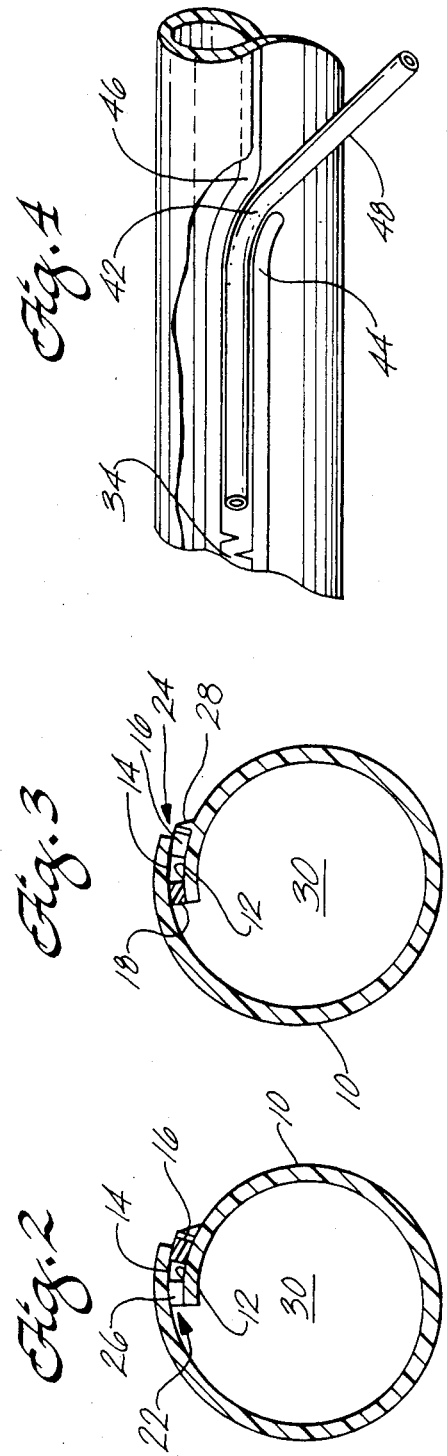

DRIP IRRIGATION HOSE

CROSS REFERENCE TO RELATED APPLICATIONS

This application is a continuation-in-part of design application Ser. No. 892,420 filed on Aug. 4, 1986, now abandoned.

BACKGROUND OF THE INVENTION

The invention relates to a drip irrigation hose of the general type described in U.S. Pat. No. 4,247,051 which issued Jan. 27, 1981 to the present inventor. The disclosure of this patent is incorporated fully herein by reference.

As described in the patent, crop irrigation systems are well known and have been in agricultural use since early history. Current irrigation systems include field flooding, furrow flooding, and sprinkler. These prior art systems, however, tend to waste water, and they also tend to wash away nutrients, to compact the soil, and to aid in the growth of weeds. Also, these prior art systems for the most part require considerable labor in their operation, and they also tend to supply water to the irrigated crops at undesirable rates.

In order to reduce the problems inherent in the prior art systems discussed in the previous paragraph, various types of drip irrigation systems have come into widespread use. Unlike the systems described above which distribute excess water over wide areas, drip irrigation systems supply water at a slow, controlled rate to the root zone of the particular plants being irrigated. Typically, the foregoing is accomplished by providing a low volume water outlet at each plant which permits a limited dripping or flowing of water directly to the root zone of the particular plant. Since evaporation, runoff, overwatering, and watering beyond the root zone is eliminated, substantial water and nutrient savings are realized.

There are two major types of drip irrigation systems in present-day general use. One involves the use of fittings, or emitters, which are designed with restricting passages through which water must pass to an outlet. Such emitters, however, are relatively costly. Another type utilizes a continuous hose. The invention described in U.S. Pat. No. 4,247,051 is concerned with the continuous hose type of drip irrigation system.

SUMMARY OF THE INVENTION

According to the invention, the outer rib-like adhesive bead of drip irrigation hose of the general type described in U.S. Pat. No. 4,247,051 has one or more advantageous features. One such feature is placement of this bead such that it extends beyond the outer edge of the film-like sheet that forms the margins. Another feature is the formation of bends in the outer adhesive bead without interruption to form outlets from the hose. These bends serve to divert roots and soil from the outlets thereby preventing clogging. A third feature is a discrete series of visible protrusions from the edge of the film that may serve as bar code identifying those characteristics.

BRIEF DESCRIPTION OF THE DRAWING

FIG. 1 is a top view, partly in section, of a length of drip irrigation hose illustrative of one embodiment of the invention;

FIG. 2 is a cross-sectional view of the hose of FIG. 1 taken along the line 2—2 of FIG. 1;

FIG. 3 is a cross-sectional view of the hose of FIG. 1 taken along the line 3—3 of FIG. 1; and FIG. 4 is a top sectional view of a short length of drip irrigation hose in the outlet area illustrating an inserted extension tube.

DETAILED DESCRIPTION OF THE ILLUSTRATED EMBODIMENTS

In the embodiment shown in FIG. 1, the drip irrigation hose is formed of an elongated flat film-like sheet 10 of flexible water impervious material which may, for example, be a laminate of high density polyethylene and polypropylene, and which has sufficient thickness to withstand the water pressures involved. The irrigation hose, of course, may be made from other materials, and may be laminated, extruded, or of other appropriate construction.

Spaced apart ribs 16 and 18 are die-formed adhesive beads and molded to one surface of sheet 10 adjacent to the edge of the sheet, this being achieved, for example, by using high-speed rotary dies, or other appropriate well-known forming means, all of which are intended to be embraced under the designation "die-formed". As shown, part of the inner walls of the ribs 16 and 18 are serrated to provide a series of weirs, the purpose of which will be explained.

Sheet 10 is then bent along its length, and its other surface is heat sealed or otherwise attached to the ribs to form an overlapping longitudinal seam between interior margin 12 and exterior margin 14 of sheet 10. The opposing faces of margins 12 and 14 are in juxtaposed relationship to each other. The longitudinally extending die-formed ribs 16 and 18 are precisely dimensioned, particularly their height, i.e. their protrusion from the surface of sheet 10, and are precisely spaced, and serve to interconnect the margins 12 and 14 to seal the overlapping longitudinal seam along which the ribs extend. It is advantageous for margin 14 to only partially cover rib 16 as shown in FIG. 1 and to construct ribs 16 and 18 from a material having a contrasting color, e.g. yellow, from the color, e.g. black, of sheet 10. It is only important that enough of the margin 14 covers bead 16 to insure a good physical connection therewith.

As a result, a precisely dimensioned water flow regulating tube, which closely controls the flow rate of the water emitted from the hose, is defined by ribs 16 and 18, and by margins 12 and 14. The weirs 20 are formed on the inner walls of the ribs causing turbulence in the water flowing through the flow regulating tube, this being desirable for the reasons set forth above. Specifically, the weirs are formed by pointed, i.e. triangular, protrusions from rib 16 extending toward rib 18 and pointed protrusions from rib 18 extending toward rib 16 between the protrusions from rib 16. As a result, a serpentine path for water flow is formed along the regulating tube. The dimensions of the die-formed ribs, and the spacing between the ribs, may be precisely controlled by the die-forming process to establish desired flow rates of the irrigation hose with a high degree of accuracy.

Specifically, by die-forming the ribs 16 and 18 of the flow regulating tube, as described above, rather than by using the less accurate method described in U.S. Pat. No. 4,247,051 of merely extruding two spaced adhesive beads to form the rib, not only may the regulating tube be more precisely sized, as described in the copending application, but also by use of die-forming, the inner walls of ribs 16 and 18 may be serrated, as shown in FIG. 1, to create turbulence in the water flowing through the flow regulating tube.

The flow regulating tube includes inlets 22 spaced along the hose and outlets 24 also spaced along the hose as shown. Inlets 22 are formed at interruptions in ribs 18 along the length of margin 12. The inlets 22 are each defined by the spaces between a multiplicity of longitudinally spaced small die-formed button-like members 26 molded, or otherwise attached to the outer surface of the sheet adjacent to margin 12, and heat sealed, or otherwise attached to the inner surface of the sheet adjacent to margin 14. These small die-formed members provide an entrance for water into the flow regulating tube. The cross-sectional area of the spaces between the members 26 may be smaller than the cross-sectional area of the flow regulating tube, so that the inlets may act as a filter.

The outlets 24 are each formed by interrupting the direction of rib 16. The length of the outlet is sufficiently large to assure that it does not restrict the flow and so that the outer margin 14 may flex to aid in excluding foreign matter in the entrance and allow the water pressure to open it up to flush any deposits that might accumulate. Protecting the opening of outlet 24 is a diverter 28 which is molded or otherwise attached to the outer surface of the sheet margin 12. Diverter 28 could be formed by a lateral jog or bend in rib 16 as shown in FIG. 1 or by a narrowing of the width of bead 16 so as to form the outlet between the top edge of diverter 28 and the adjacent edge of margin 14. (In the latter case, rib 16 would simply be wider than shown in FIG. 1 between diverters 28, as represented by a phantom line 29 so the lateral jog or bend is only along the inner surface of bead 16.) Thus, outlets 24 each face upwardly out of the plane of FIG. 1. The diverter is located beyond the edge of margin 14, but is not attached to it. The diverter deflects away from outlets 24 root growth and soil that would otherwise have a tendency to work their way into the outlets. Thus, margin 14 in the area of the diverter is free to flex, thereby facilitating the egress of water from the drip irrigation hose.

Accordingly, the rib 16 may additionally have protrusions that may serve as a bar code 36, or the like, for conveying information as to the size, thickness, flow rate, etc., of the particular hose. The exposed portions of the bar code protrusions may be read mechanically, manually, or electronically, to derive the corresponding information. Additionally, the adhesive may be of a contrasting color, e.g. yellow, in relation to the color of the sheet 10, e.g. black, so as to allow the bar code 36 to be easily read, to easily locate the diverter 28, and hence the outlet 24, and to provide an easily seen continuous stripe to aid in properly orienting the outlets 24 in the desired "up" position during installation.

As shown in FIG. 1, a cross rib, 32, is shaped to extend between ribs 16 and 18 from one side of the flow regulating tube to the other at each inlet. This configuration separates the flow regulating tube into a series of longitudinal sections, with each section extending between one inlet 22 and one outlet 24. Weirs 20 could be formed along the entire length of ribs 16 and 18 between each inlet 22 and outlet 24 or could be formed along only a portion thereof depending upon the application and whether or not turbulence along the entire flow regulating channel is desired.

Typically, the thickness of sheet 10 would be of the order of 4 to 15 mil. Typical dimensions for a sheet thickness of 8 mil are as follows: width of ribs 16 and 18, 60 mil; height of ribs 16 and 18, 20 mil; spacing between ribs 16 and 18 disregarding weirs 20, 120 mil; minimum spacing between opposing weirs 20, 25 mil. Typical lengthwise dimensions are as follows: length of inlet 22, 1¼ inch; length of weired channel, ⅞ inch; length of direct channel between weirs 20 and outlet 28, 0 to ⅜ inch; length of outlet 24, 1¼ inch. Typically, the diameter of the hose is ⅝ inch.

As described, each group of longitudinally spaced die-formed members 26 forms an inlet port 22 for the flow regulating tube; and each root and soil diverter 28, protects each outlet 24, of the flow regulating tube 34; and protrusions 36 serve as a bar code, or the like, for information purposes as explained above. The outlets, as shown, are displaced longitudinally from the respective inlets so that water must travel a substantial distance through the flow regulating tube from each inlet to a respective outlet.

Water flowing through the interior 30 of the hose also flows through the inlets 22 between the members 26, which form the inlet filter referred to above, into the flow regulating tube which serves as a secondary water distribution passage. The restricted cross-section of the regulating tube 34, the turbulence generated by the weirs 20, and the distance of travel therethrough control, i.e. regulate, the flow of water in the regulating tube, and thereby regulate the flow of water through the outlets 24.

Thus, the inlets and outlets themselves may have sufficiently large diameter so as not to be susceptible to plugging. In addition, the flow within the regulating tube is of sufficient velocity and turbulency when operating under normal conditions to provide self-cleaning for the inlets and outlets.

As mentioned above, cross rib 32 serves to divide the flow regulating tube into a series of mutually isolated longitudinal sections, with each section extending between one of the inlets 22 and one of the outlets 24.

As taught in my referenced patent, ribs 16 and 18 must have sufficient height, e.g. to separate the interior and exterior margins 12 and 14 of the lapped seam which defines the regulating tube. Otherwise sufficient water would be prevented from flowing from the inlets 22 to the outlets 24.

As shown in FIG. 4, an alternate outlet 42 defined by elongated die formed ribs 44 and 46 may be so configured to receive a flow extension tube 48 to convey the water leaving the flow regulating tube to a position other than adjacent to the outlet 42. Specifically, alternate outlet 42 is formed by curving ribs 44 and 46 gradually toward outlet 42, which in this case faces in a direction lying in the plane of the paper in FIG. 4. Therefore, tube 48 is installed by moving its end in the plane of the paper in FIG. 4 toward outlet 42. The curvature of ribs 44 and 46 guides the end of tube 48 smoothly into the flow regulating tube of the hose.

Specifically, uniformity of water flow is achieved because the flow regulating tube sections are essentially fed in parallel by the full static pressure of the interior 30 of the drip irrigation hose, and not through a long low pressure secondary regulator tube. This feature also serves to reduce the requirement to level or contour fields being watered by the hose, or for the precise placement of the hose in the field.

The filters formed by the members 26 at the inlets to the regulating tube sections protect the regulating tube sections from clogging. The filters are self-cleaning as the water is turned on and off. Specifically, the reverse water flow from the flow regulating tube sections to the interior 30 of the hose when the water is turned off causes the filters to be back flushed.

The flow regulating tube of the hose of the present invention may have configurations other than those shown in FIGS. 2 and 3, for example, such as shown in FIGS. 7, 8 and 9 of U.S. Pat. No. 4,247,051.

The invention provides, therefore, an improved drip irrigation hose which may be manufactured simply and inexpensively, and which is reliable in operation and has little tendency to clog. By die-forming ribs 16 and 18, including weirs 20 and bar code protrusions 36, members 26, diverters 28 and cross ribs 32 of the flow regulating tube in a single operation, the flow regulating tube may be precisely sized, resulting in highly accurate flow rates. In addition, by forming the interior walls of the ribs into series of weirs, a desired turbulence in the water flowing through the flow regulating tube is achieved.

It will be appreciated that, while particular embodiments of the invention have been shown and described, modifications may be made. It is intended in the claims to cover all modifications which come within the true spirit and scope of the invention.

I claim:

1. A drip irrigation hose comprising:
   an elongated flat sheet of flexible water impervious material bent along its length to form an overlapping longitudinal seam between opposing inner and outer longitudinal margins of the sheet;
   first and second longitudinally extending rib like adhesive beads interconnecting the opposing margins to seal the overlapping seam and to form a flow regulating tube defined by the rib like beads and the margins, the bead closest to the outer margin extending beyond its edge;
   a plurality of inlets to the flow regulating tube distributed at intervals along the hose; and
   a plurality of outlets from the flow regulating tube distributed at intervals along the hose displaced from the respective inlets.

2. The drip irrigation hose of claim 1 in which the bead closest to the outer margin is made from a color that contrasts with the flat sheet.

* * * * *